364-517 SR

XR 3,068,463 15454

X69589

Dec. 11, 1962 B. M. GOLDMAN 3,068,463

MULTILEVEL DATA COMMUNICATION SYSTEM HAVING RATIO COMPARISON OF SAMPLED ADJACENT BITS AT THE RECEIVER

Filed Dec. 12, 1960 12 Sheets-Sheet 1

INVENTOR.
BERNARD M. GOLDMAN
BY Marvin Moody
ATTORNEY

INVENTOR.
BERNARD M. GOLDMAN
BY Marvin Moody
ATTORNEY

INVENTOR.
BERNARD M. GOLDMAN
BY [signature]
ATTORNEY

INVENTOR.
BERNARD M. GOLDMAN
BY [signature]
ATTORNEY

Dec. 11, 1962 B. M. GOLDMAN 3,068,463

MULTILEVEL DATA COMMUNICATION SYSTEM HAVING RATIO COMPARISON OF SAMPLED ADJACENT BITS AT THE RECEIVER

Filed Dec. 12, 1960 12 Sheets-Sheet 5

INVENTOR.
BERNARD M. GOLDMAN
BY Marvin Moody
ATTORNEY

INVENTOR.
BERNARD M. GOLDMAN
BY [signature]
ATTORNEY

INVENTOR.
BERNARD M. GOLDMAN
BY [signature]
ATTORNEY

INVENTOR.
BERNARD M. GOLDMAN
BY [signature]
ATTORNEY

INVENTOR.
BERNARD M. GOLDMAN
BY [signature]
ATTORNEY

INVENTOR.
BERNARD M. GOLDMAN
BY Max Moody
ATTORNEY

INVENTOR.
BERNARD M. GOLDMAN
BY [signature]
ATTORNEY

INVENTOR.
BERNARD M. GOLDMAN
BY [signature]
ATTORNEY

United States Patent Office 3,068,463
Patented Dec. 11, 1962

3,068,463

MULTILEVEL DATA COMMUNICATION SYSTEM HAVING RATIO COMPARISON OF SAMPLED ADJACENT BITS AT THE RECEIVER

Bernard M. Goldman, Poughkeepsie, N.Y., assignor to Collins Radio Company, Cedar Rapids, Iowa, a corporation of Iowa Filed Dec. 12, 1960, Ser. No. 75,147
16 Claims. (Cl. 340—347)

This invention relates to a unique type of amplitude-keying useful in signalling data digits. The invention can be applied on a frequency-simplex basis, or on a frequency-multiplex basis.

In the prior art, "on-off" keying is a commonly found form of amplitude keying, wherein "on" represents a "mark" and "off" represents a "space" (or vice versa). It has been known and used for many decades. More recently, frequency-shift keying has superseded amplitude keying. Often, it has been automatically presumed that frequency-shift keying is superior; and "off-on" keying, to a large extent, dropped by the wayside, except for manually-operated code signalling.

In prior systems, a keyed signal was detected by having an established reference level at the receiver. A received signal-bit below the established level was considered a "space," and a signal above the level was considered a "mark" (or vice-versa). The detection reference levels previously used were either: (1) fixed, or (2) varying as an automatic-gain control (AGC) function.

Neither prior technique for establishing a detection level was ideal for a signal: (1) in a relatively noisy background, and/or (2) fading in a fast manner compared to the AGC time-constant. Making the AGC time-constant short and of the same order as the bit-length also was not desirable, because it caused interference between succeeding bits of the signal to make detection more difficult.

It is a principal object of this invention to provide a bit-synchronous communication system in which a detection decision for each bit of digital information is dependent only upon the amplitude levels of two adjacently received signal-bits.

It is another object of this invention to base each detection decision upon "averaged" levels of adjacently received signal-bits in preference to "instantaneous" levels.

It is still another object of this invention to provide an "on-off" signalling system in which "mark" and "space" digits correspond to change and lack of change of level between adjacent signal-bits. For example, no level change between two signal-bits can indicate a "space," whether the two bits be both "on" or both "off" conditions of the transmitted signal. On the other hand, a "mark" is indicated by a level change between the two signal-bits, whether the change is from "off" to "on" or from "on" to "off." Therefore this invention is not like prior "on-off" keyed-signalling systems, since in the invention the "on" and "off" conditions do not correspond to respective "marks" and "spaces" (or vice-versa) of a transmitted signal.

It is a further object of this invention to provide a bit-synchronously-keyed communication system that is much less susceptible than prior amplitude-keyed systems to erroneous detection caused by rapid signal fading. This can be done in the invention by making the signal-bit period short compared to the fading rate, yet long compared to multipath delay.

It is still a further object of this invention to frequency multiplex any number of keyed frequencies simultaneously on a bit-synchronous basis.

It is a feature of this invention to provide transmission encoding of "marks" and "spaces" by representing them as different ratios between amplitudes of successively transmitted signal-bits.

It is another feature of the invention to detect the signal by a sequence that: integrates the amplitude of a received signal over each signal-bit period, samples the integrated amplitude at an instant occurring at a time $\tau$ from the beginning of the integration period, stores the sampled amplitude of the bit at least until the integrated amplitude of the next bit is sampled at a time $\tau$, computes the "absolute" ratio between the sampled amplitudes of adjacent bits, and determines whether the ratio is in a "mark" or "space" ratio range to detect the information content. Alternately, the invention first stores the instantaneous amplitudes of each received signal-bit for a bit period, determines the instantaneous "absolute" ratios between instantaneous amplitudes of the stored signal-bit and a signal-bit being received, integrates the instantaneous ratios while they are being determined during each signal-bit, samples each integration after it has continued for a period $\tau$ from a quenched condition to obtain the averaged "absolute" ratio, and determines whether the ratio is in a "mark" or "space" ratio range to detect the information content.

The term "absolute" ratio is used in this specification, although it may not be found in the mathematics arts. It is defined as follows: Each of two numbers has the same "absolute" ratio with unity if one number or its inverse is equal to the other member. Hence, $$\frac{a}{b}$$

and $$\frac{b}{a}$$

have the same "absolute" ratio. It therefore eliminates the distinction between a number and its inverse. Accordingly, "absolute" ratio defines a general relationship of a number to unity. It thus is used in a sense similar to the term, absolute value, which eliminates the distinction between a positive number and its negative.

Noise and fading will prevent an "absolute" ratio between amplitudes of two successively received signal-bits from being the same as their transmitted "absolute" ratio, which is 0 or 1 for "mark" or "space." Therefore, it is essential that a receiver make a "mark" or "space" decision with respect to defined ranges of "absolute" ratios that will most likely yield correct decisions. For example, it can be expected that a ratio somewhat less than unity (indicating a "space") will necessarily be received when a unity ratio is transmitted. In other words, even though bits are transmitted with precisely the same amplitude, rapid fading or impulse noise can cause variation from unity ratio. Hence, it is expected that a received "absolute" ratio in a range adjacent to unity will determine a "space."

And, similarly, it can be expected that an "absolute" ratio somewhat greater than zero will be received to indicate a "mark," although an "absolute" ratio of zero was transmitted. In other words, noise received during a zero-transmitted signal-bit will be detected with an average value that is not zero. Hence it is expected that a received "absolute" ratio in a range adjacent to 0 will determine a "mark." For example, one may assign an "absolute" ratio range from 1 to 0.5 as the domain of a "space." And the "mark" range may then be the range of "absolute" ratios from 0 to 0.5.

This is not to imply that the "absolute" ratio boundary between the "mark" and "space" ranges should be midway between 0 and 1. Different communication conditions can cause different optimum positions for the boundary. Large amounts of white noise equally adding to the average power of all signal-bits moves the optimum boundary toward unity. Such continuous noise does not affect the unity ratio for "space," but can greatly affect the expected ratios for "mark." For example, a system designed for a signal-to-noise ratio of 1/5 due only to continuous white noise will require an optimum boundary at the "absolute" ratio 5/6. White noise without significant impulse noise is a condition commonly found in U.H.F. radio communications.

On the other hand, intermittent impulse noise and rapid fading found in H.F. radio communications can cause wide variations in the ratios for both "space" and "mark." As intermittent noise and/or the rapidity of fading become more intense, the "absolute" ratios received for "mark" and "space" are likely to vary farther from zero and unity, respectively. Accordingly, a boundary of 0.5 may appear desirable for a situation of rapid fading or intermittent noise with substantially no steady noise. This boundary also may be desirable with V.L.F. radio communications, which primarily has impulse noise. However, combinations of substantial white or Gaussian noise with impulse noise, such as often found in wireline communications, may require a boundary at an "absolute" ratio that is closer to unity than to zero.

Further advantages, objects, features, and theory of operation of this invention will become more clarified to one skilled in the art upon further study of the remaining specification and accompanying drawings, in which.

Figure 1:
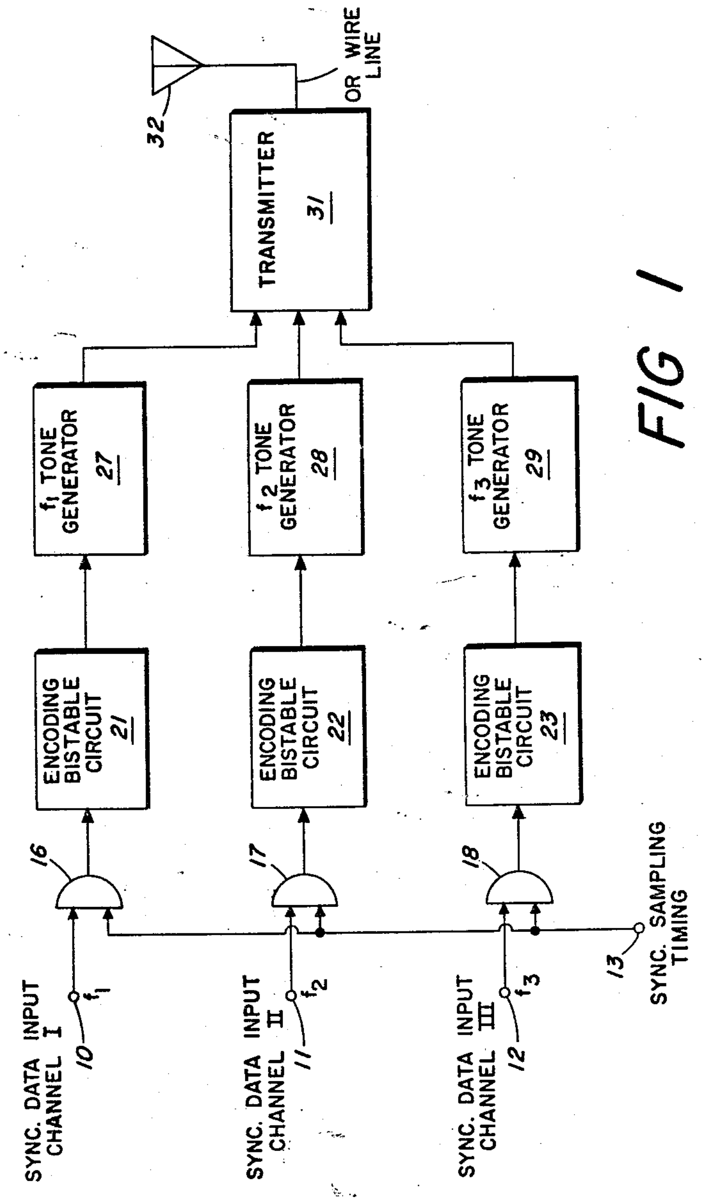
FIGURE 1 illustrates a transmitter embodiment of the invention.
Figure 2:
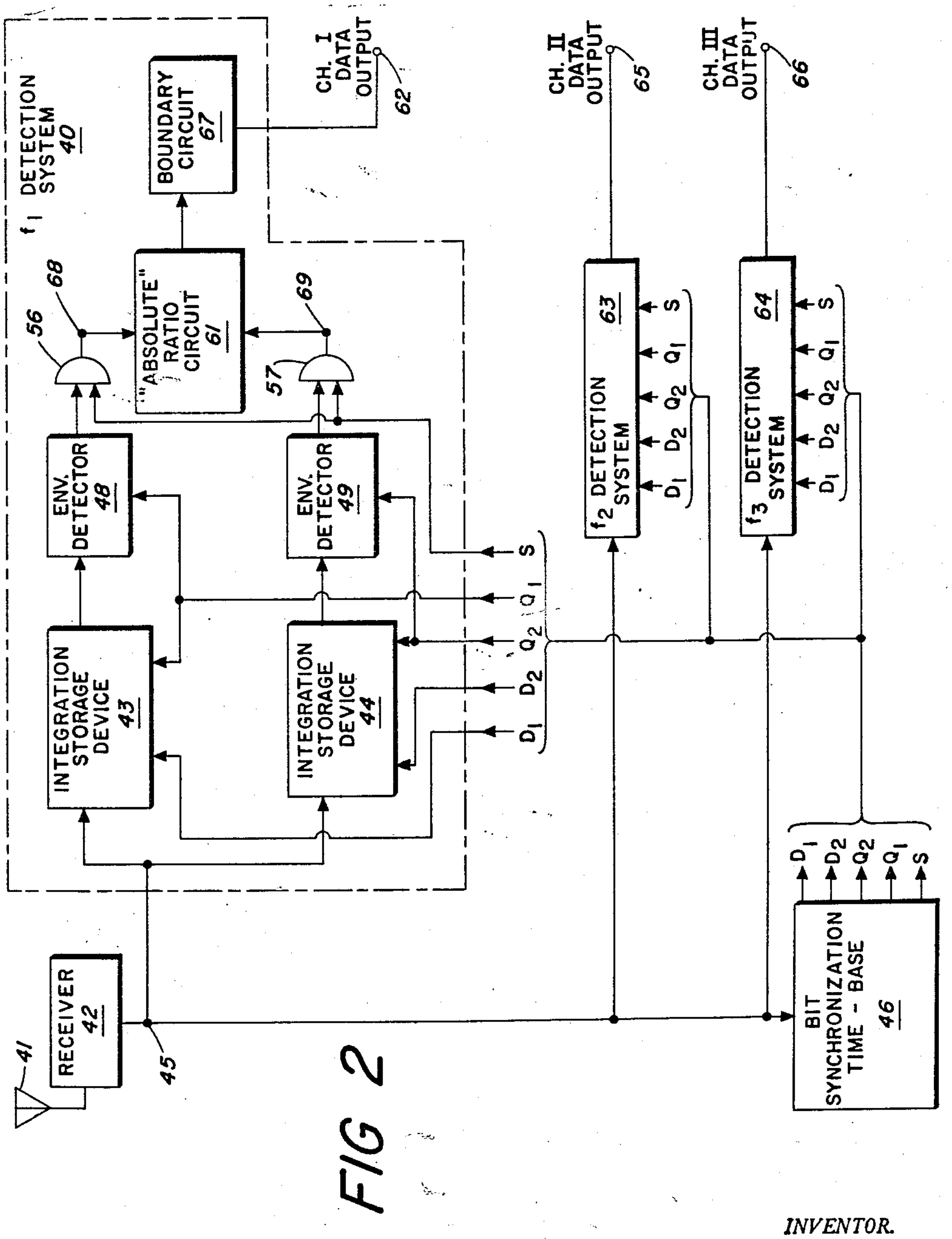
FIGURE 2 shows a receiver embodiment of the invention.
Figure 4:
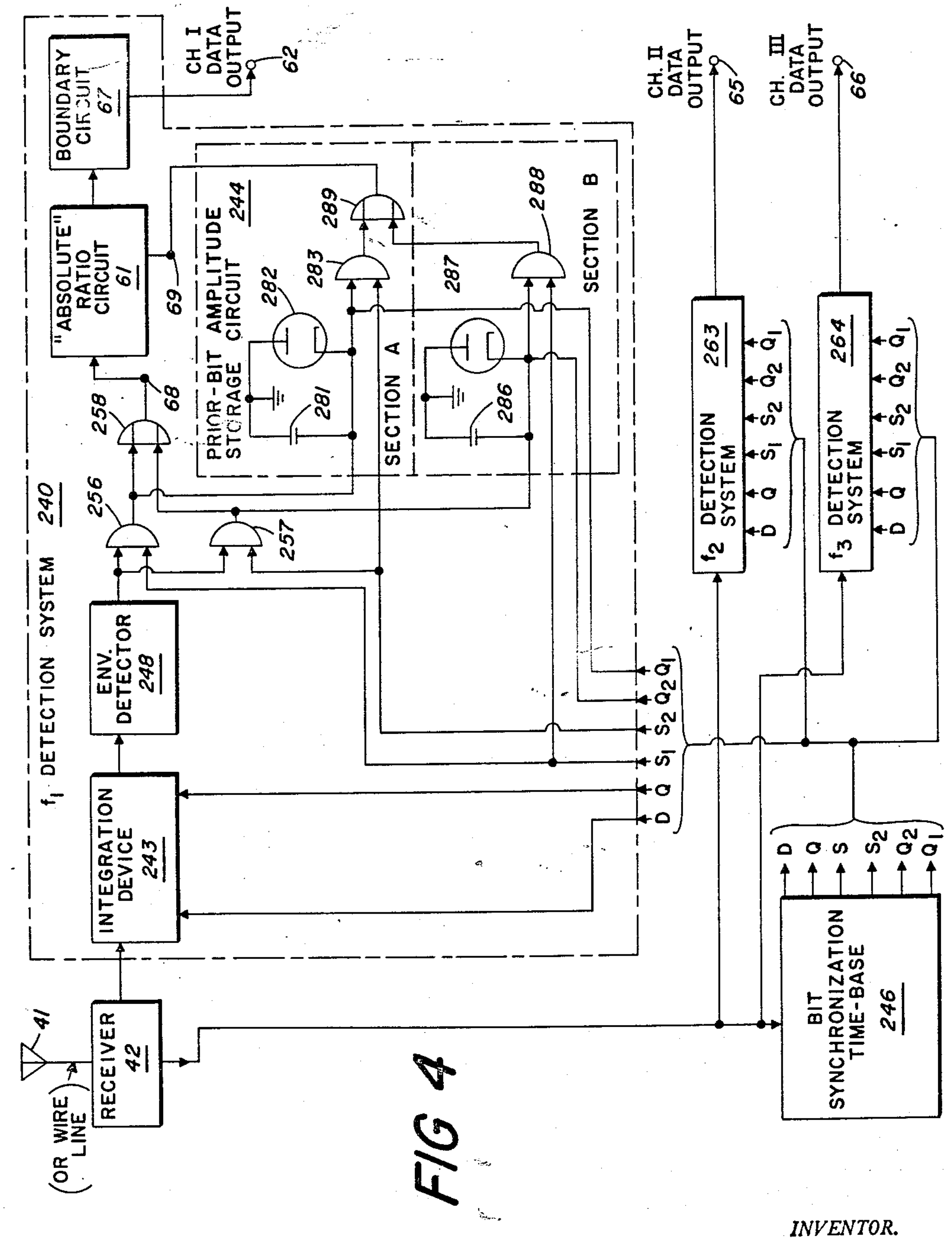
FIGURE 4 shows another receiver embodiment.
Figure 5:
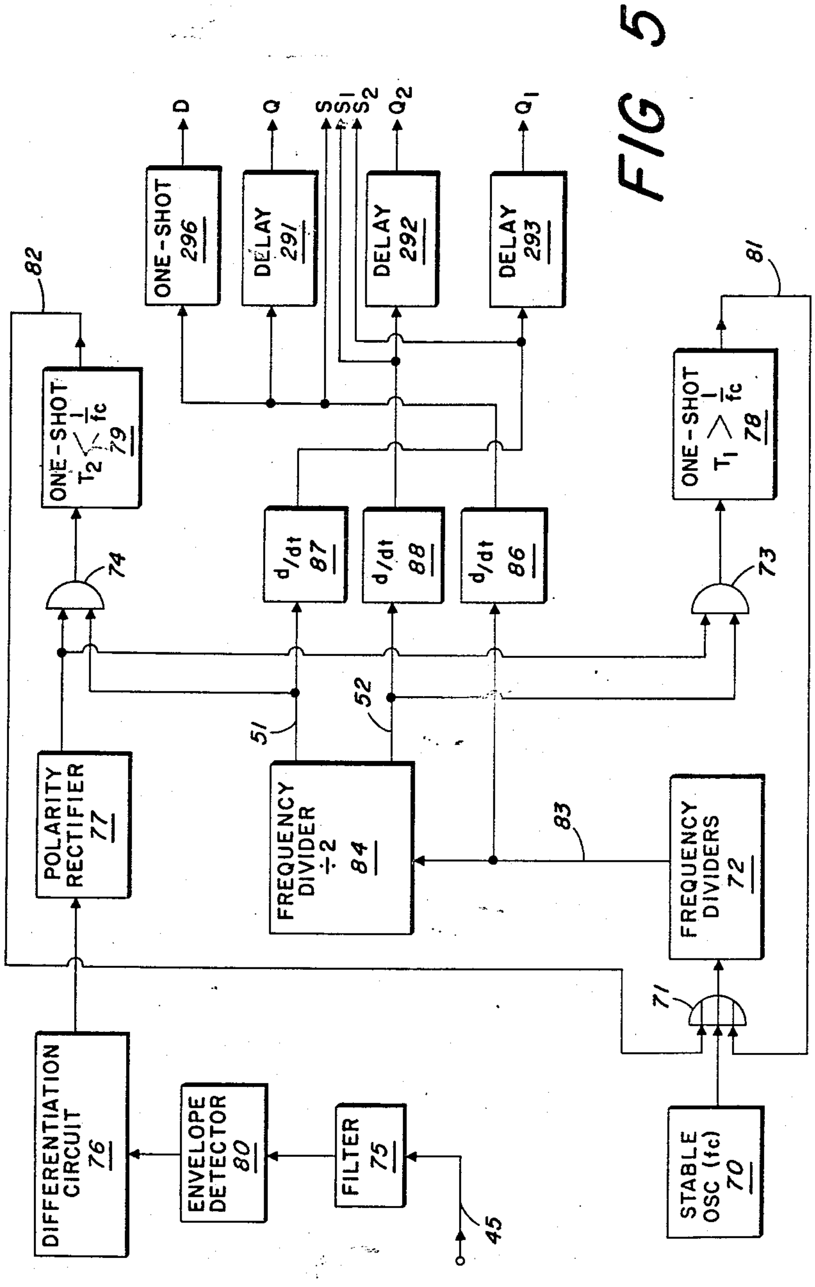
Figure 7:
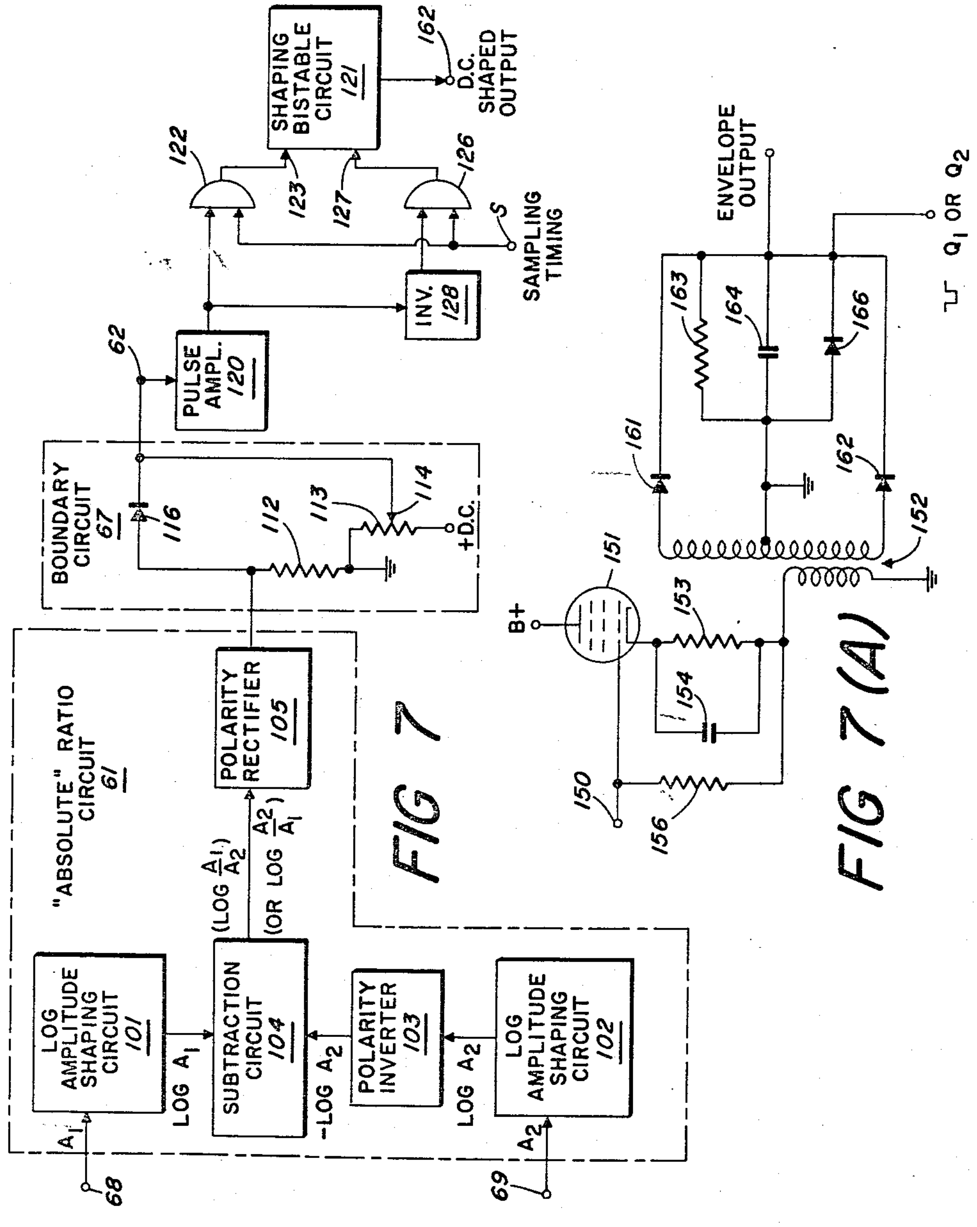
Figure 11:
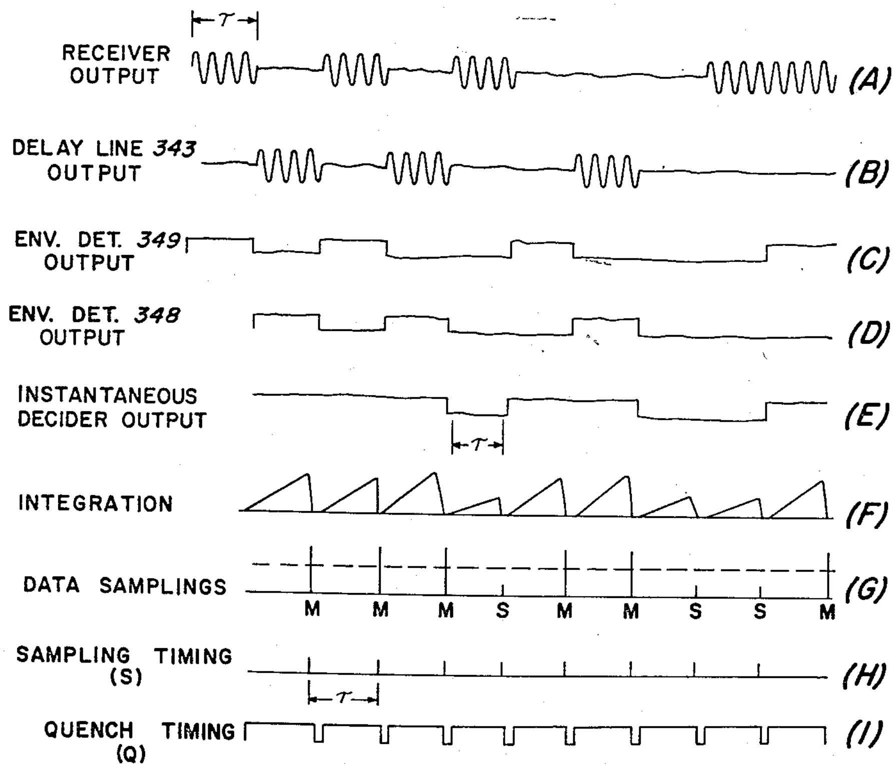
Figure 10:
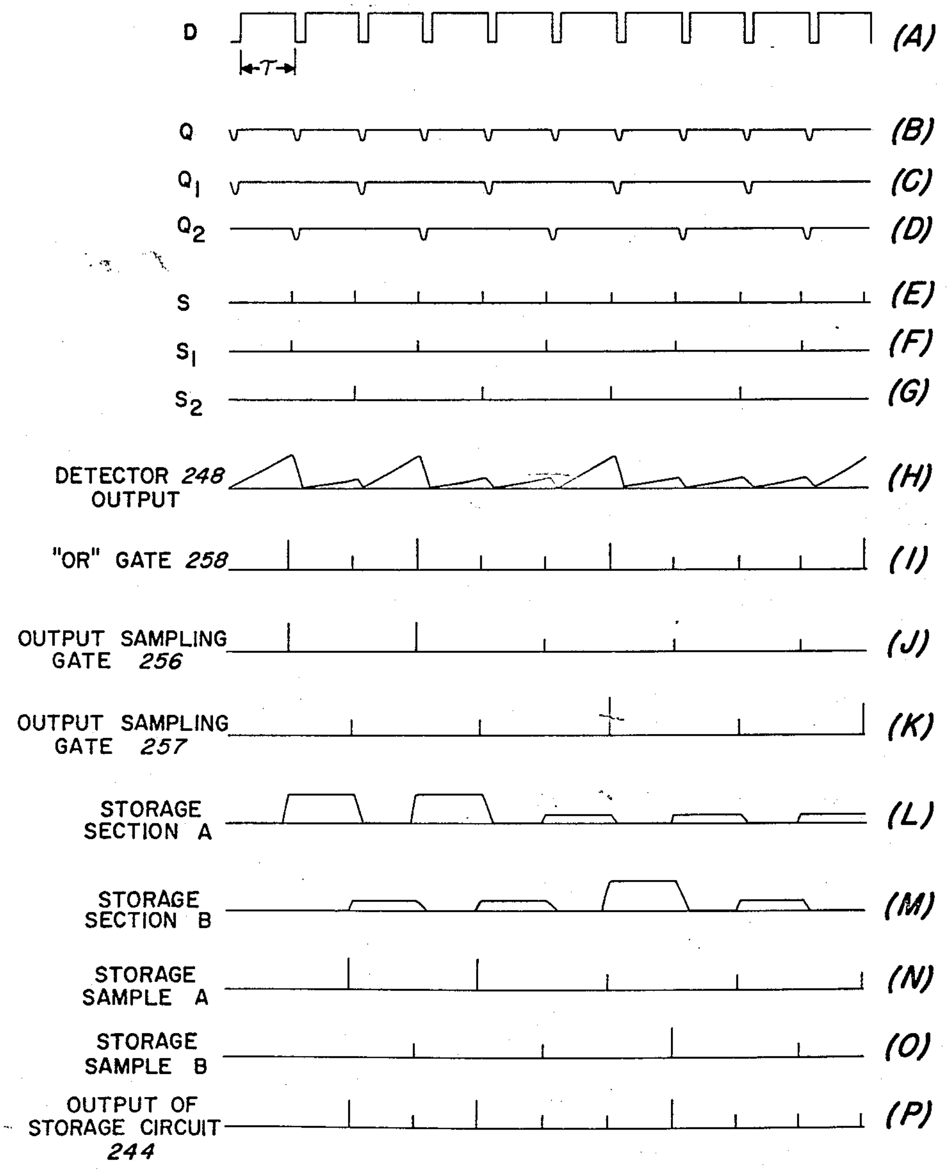
Figure 12:
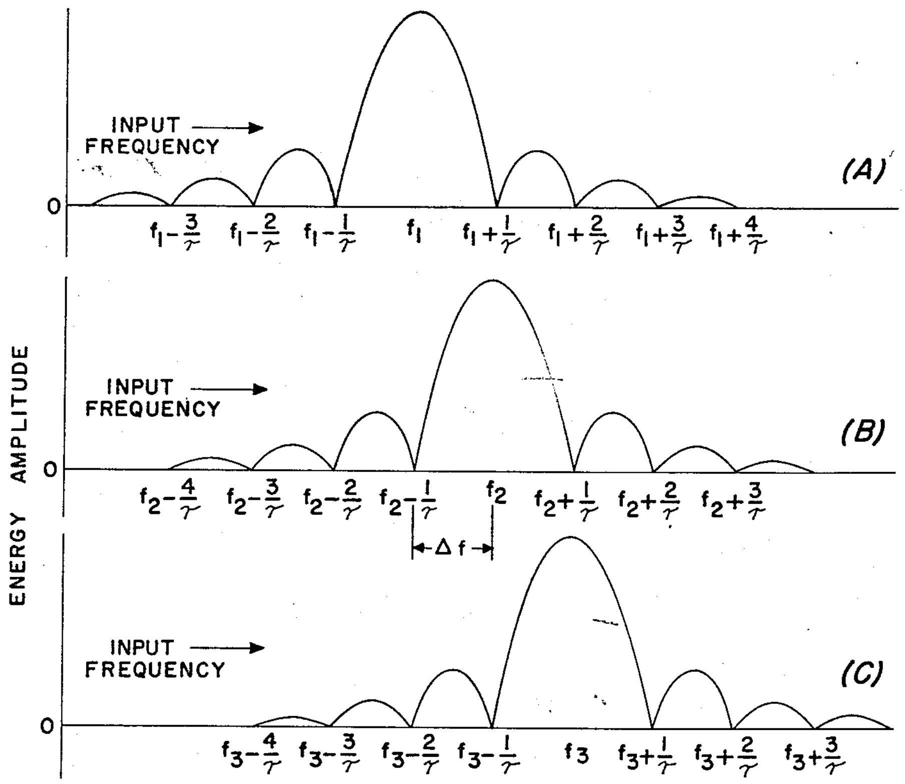

FIGURE 5 provides a synchronized time-base for FIGURE 4;

FIGURES 6(A) and (B) illustrate still other receiver embodiments;

FIGURES 7 and 7(A) show particular forms for detection-system components;

FIGURES 8(A)–(E) provide wave-forms used in explaining the operation of the transmitting embodiment of FIGURE 1;

FIGURES 9(A)–(L) illustrate wave-forms used in explaining the receiving embodiment of FIGURE 2;

FIGURES 10(A)–(P) are wave-forms used to explain the receiving embodiment of FIGURE 4;

FIGURES 11(A)–(I) provide wave-forms used to explain the receiving embodiments of FIGURES 6(A) and (B); and FIGURES 12(A), (B) and (C) are frequency vs. sampled-energy relationships for three infinite-Q resonators that are tuned to respective frequencies $f_1$, $f_2$, and $f_3$ that have their energies sampled simultaneously at a fixed time $\tau$ after they begin to simultaneously receive any particular frequency along the abscissa.

The drawings are hereafter considered in detail. FIGURE 1 illustrates a transmitting terminal for a communication system embodying the invention. Data sources outside this invention supply three synchronous channels of binary data to inputs 10, 11 and 12. The three input channels are simultaneously synchronous in the sense that their signal-bits start and end together. Also, the input channels are assumed to be conventionally coded in the form of "marks" and "spaces" represented by two direct-current levels.

The three data sources are supplied as respective inputs to "and" gates 16, 17, and 18. Each gate has another input connected to a terminal 13, which receives synchronous-timing pulses provided by a clock source (not shown) that controls the synchronization of the input data. The timing pulses are phased with the mid-portions of the input data bits.

Consequently, it is presumed that each "and" gate provides an output pulse only when there is coincidence between a "mark" input and a timing pulse; and accordingly, there is no output during a "space" input bit.

A plurality of bistable circuits 21, 22 and 23 encode the received data for transmission. Each bistable circuit is connected as binary divider; wherein an input pulse triggers its output to an opposite state regardless of its initial state. Each bistable has an input respectively connected to an output of "and" gate 16, 17 or 18. Accordingly, each encoding bistable circuit is switched only by a "mark" input bit, and it retains its prior state for each "space" input.

A plurality of tone generators 27, 28 and 29 have respective frequencies $f_1$, $f_2$, and $f_3$ which are frequency-spaced in a manner that will be discussed later in more detail. Each tone generator has a modulating input connected to an output of a respective encoding bistable circuit 21, 22, or 23. The output of each tone generator is switched off and on by the opposite output levels provided from its bistable circuit.

Figure 8:
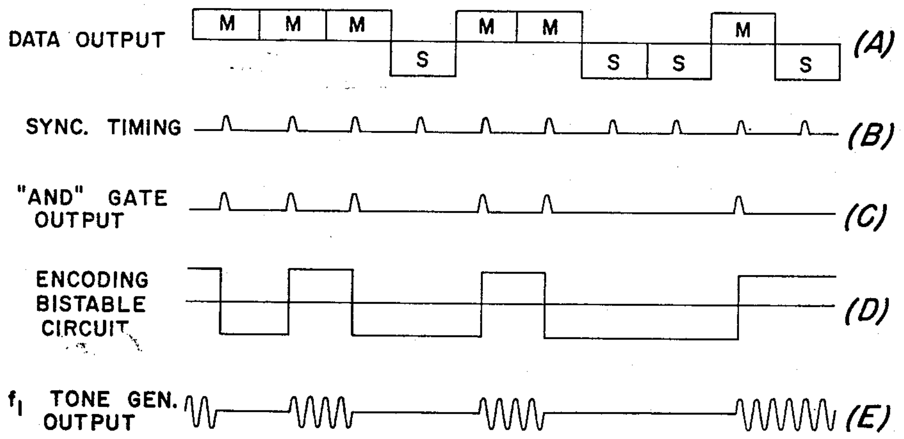

The operation of any transmitted channel may be further explained using FIGURES 8(A)–(E). FIGURE 8(A) illustrates a data input supplied to terminal 10, for example. FIGURE 8(B) shows the corresponding timing pulses at terminal 13. FIGURE 8(C) shows the output pulses resulting from "and" gate 16, which only occur when "marks" are provided. FIGURE 8(D) illustrates the output of encoding-bistable 21 in response to the triggering indicated in FIGURE 8(C); in which each pulse reverses the bistable state. FIGURE 8(E) shows the output of tone generator 27 as modulated by encoding bistable 21.

Note that the "on-off" conditions of tone $f_1$ in FIGURE 8(E) do not directly correspond to the input data levels of FIGURE 8(A), in the sense of conventionally keyed tones. Accordingly, an element of privacy can result from communicating with this system.

Before data is transmitted, bistables 21, 22 and 23 are all set to the same level; and a "mark" signal level is provided at all data input terminals 10, 11, and 12. There results a series of pulses from the "and" gates which trigger the bistable circuits in unison to alternate high and low levels. Accordingly, the tone generators in unison provide alternate "on" and "off" signals that represent the continuous "mark" inputs. An initial "mark" transmission of this type enables a receiver to become synchronized for the reception of data, as will be discussed later in more detail.

The outputs of the tone generators are combined and amplified by a transmitter 31. For radio operation, transmitter 31 includes conventional heterodyning and amplifying means, so that the tones can be translated to a required frequency range for radiation by an antenna 32. However, for wire transmission, transmitter 31 may be merely an amplifier which connects to a wire line.

In FIGURE 2, a receiving terminal is provided for detecting signals received from the transmitting terminal of FIGURE 1. Thus, in FIGURE 2, an antenna 41 is connected to a conventional receiver 42, which amplifies and frequency translates the received signals into the audio frequency range. The modulated tones are presumed translated back to their original frequency levels of $f_1$, $f_2$ and $f_3$, although this is not a mandatory requirement. For wire-line reception, receiver 42 could merely be an amplifier.

Receiver 42 in FIGURE 2 has a relatively wide bandwidth so that high-amplitude impulse noise does not cause it to ring; and it therefore should have no filtering for separating the respective tones.

To segregate and detect the three received tones, three similar detection systems 40, 63 and 64 are connected to an output 45 of receiver 42. Thus, each system 40, 63 or 64 detects a different one of modulated tones $f_1$, $f_2$ or $f_3$. Each of systems 40, 63 and 64 also receives bit-synchronization timing from a receiver time-base 46, which is needed for the detection process.

Since detection systems 40, 63 and 64 are similar, only system 40 is broken into component parts in FIGURE 2. It includes a pair of integrating-storage devices 43 and 44 each tuned to frequency $f_1$. In systems 63 and 64, like pairs of resonant devices are tuned to frequencies $f_2$ and $f_3$, respectively. Each integration-storage device can be a keyed filter of the type described and claimed in Patent No. 2,825,808 to Melvin L. Doelz and Earl Heald. Briefly, such keyed filter comprises a stable resonator tuned to the expected frequency of a tone that is to be detected. Positive feedback is normally provided about a keyed filter to obtain a Q that goes into the thousands. Such a device can provide alternating-current integration on an amplitude-envelope basis. For example, a constant-amplitude input at the tuned frequency provides a resonance with an amplitude envelope that increases linearly. Thus, the resonant output envelope represents an integration of the input envelope. A momentary very strong negative feedback is provided about the resonator prior to each integration operation to quench any pre-existing oscillation. The result of each integration is obtained by a sampling of the resonant buildup after a particular integration time $\gamma$. When time $\gamma$ is fixed, the sampled amplitude is proportional to the average amplitude of the input over the integration period.

After an integration in FIGURE 2, storage is obtained by permitting the same high-Q device to ring for the bit period following an integration. Its very high Q prevents decrement error over a relatively short bit period. Of course, no input is permitted during the storage period. After the storage period the ringing is quenched and the device is ready for the next integration.

In each detection system of FIGURE 2, one integration-storage device of each pair is integrating a received signal-bit; while the other device of the pair is storing the averaged amplitude of the prior signal-bit of the same tone.

Thus, the pair of integration devices 43 and 44 in system 40 continually alternate their functions of storing and integrating.

Bit-synchronization time-base 46 in FIGURE 2 provides two sets of timing for the alternate functioning of devices 43 and 44. Each set of timing informs one device when the following operations occur to it in the given order: quenching, integration, sampling, storing, sampling, and repeat.

Figure 9:
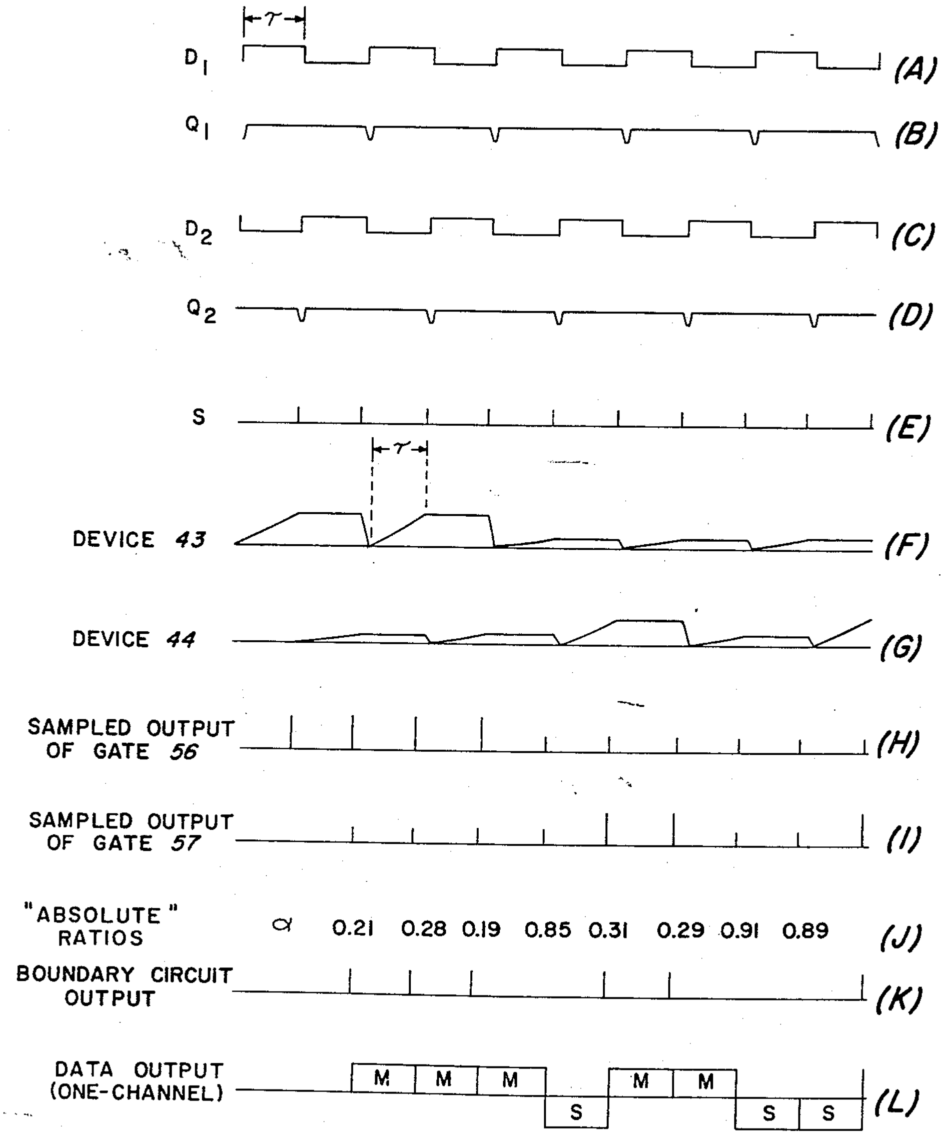

FIGURES 9(A)–(E) illustrate waveforms from time-base 46 used to time devices 43 and 44 in FIGURE 2. Wave $D_1$ of FIGURE 9(A) is applied to device 43 to control its integration and storage cycle. During the high level of wave $D_1$, the input to device 43 is enabled and it integrates the received tone. During the low level of wave $D_1$, the input to device 43 is disabled and it stores. Wave $Q_1$ in FIGURE 9(B) is applied to device 43 to quench it prior to each integration-storage cycle.

Likewise, second device 44 is informed of integration and storage by timing $D_2$, shown in FIGURE 9(C), which is oppositely-phased from timing $D_1$ to obtain alternate operation.

The resonant alternating-voltages of devices 43 and 44 can be sampled directly; or their resonant envelope can be detected and sampled. In this embodiment, the latter is used. Thus, envelope detectors 48 and 49 are connected to the outputs of devices 43 and 44. A short time-constant of the order of one period of $f_1$ is associated with each detector 48 or 49, which preferably is a full wave rectifier.

Envelope detectors 48 and 49 have very high-input impedances so that they do not lower the Q or change the tuned frequency of resonant devices 43 and 44. The quench timing $Q_1$ and $Q_2$ is also applied respectively to envelope detectors 48 and 49 to assure that their reactive components do not retain any stored energy at the start of the next integration, since stored energy would cause error.

FIGURE 7(A) illustrates one form for envelope-detectors 48 and 49. It includes a pentode 151 connected conventionally as a cathode-follower. Thus, its control-grid terminal 150 is connected to the input of device 43 or 44. The primary of a broadband transformer 152 is connected in series with a resistor 153 between the tube cathode and ground (which is any common-potential level for the system). A capacitor 154 is connected across resistor 153 to establish a direct-voltage bias for class A operation. The secondary of transformer 152 has a grounded center-tap; and diodes 161 and 162 are connected between its opposite ends and one end of a load resistor 163, which has its other end grounded. Diodes 161 and 162 are polarized to provide positive-polarity full-wave rectification across resistor 163. A capacitor 164 obtains a time-constant with resistor 163 that is about as long as one or two periods of frequency $f_1$. A diode 166 with its anode grounded assists quenching and is connected across capacitor 164. Negative quenching pulses $Q_1$ or $Q_2$ are provided to the cathode of diodes 166, 162 and 161. During the short quenching pulses, these diodes are made to conduct and in effect provide very-low resistances to ground across capacitor 164 and the opposite halves of transformer 152 to quickly quench any stored energy in these components.

A simultaneous sampling of both devices 43 and 44 occurs at the end of each received signal-bit. The sampling operation is done by a pair of respective "and" gates 56 and 57 that sample the instantaneous amplitudes of envelope-detectors 48 and 49 at times determined by sampling pulses S from time-base 56, illustrated in FIGURE 9(E). Thus, samplings simultaneously occur at the end of an integration period for one device and at the end of a storage period for the other device; and these functions alternate between devices 43 and 44 from one received bit to the next. The sampling timing must be precise for the alternate devices in order to obtain accurate samplings.

The sampling and quenching time is at the expense of integration time $\gamma$. Hence $\gamma$ is necessarily smaller than the signal-bit period T. The integration period $\gamma$ is maximized to obtain a maximum detection signal-to-noise ratio, by making the sampling and quench time as short as possible.

In multiplexed systems involving a plurality of simultaneously-modulated tones, the length of integration period $\gamma$ is also related to cross-modulation among the tones. The cross-modulation factor is controlled by relating $\gamma$ to the frequency spacing $\Delta f$ between adjacent tones. Cross-interference among the tones is avoided when the choice of $\gamma$ is $$\frac{n}{\Delta f}$$

where $n$ is any integer other than zero, and the sampling time is infinitesimally short. A sampling time of the order of one cycle of $f_1$ obtains very little cross-interference. The absolute frequencies of the tones are not critical as long as the required frequency spacings are provided. Also the spacings between adjacent tones in a multiplexed set need not all be the same, since the integer value of $n$ can be varied among the tones; however it is generally preferable to use a single value for $n$ among all tones in a set. Maximum bandwidth conservation is obtained where $n$ is one.

By this choice of $\Delta f$ and $\gamma$ all other tones will have nearly zero magnitude at the sampling instant, which is extremely short. These relationships can be obtained from FIGURES 12(A), (B) and (C). FIGURE 12(A) illustrates the end-of-integration energy vs. input frequency for each gated device 43 or 44 in system 40; FIGURE 12(B) illustrates the end-of-integration energy vs. frequency response for a like pair of devices tuned to $f_2$ in system 63; and FIGURE 12(C) illustrates the response for a like pair of devices tuned to $f_3$ in system 64. Note in FIGURES 12(A), (B) and (C) that the frequency spacing $\Delta f$ between tones $f_1$ and $f_2$ has integer $n$ equal to one, while the spacing between $f_2$ and $f_3$ has integer $n$ equal to two.

FIGURES 12(A), (B) and (C) all have a common frequency scale along their abscissas. That is, a vertical line through the three figures represents the same input frequency on each of the three abscissas; and the three amplitudes in the respective figures along the vertical line represent the total (integrated) energy existing in the three respective integration-storage devices, after all are quenched and receive the input frequency for time $\tau$. Therefore FIGURES 12(A), (B) and (C) can be used to represent comparative relationships among energies in the three devices existing at simultaneous samplings made at the end of integration time $\tau$, or made from storage that began at time $\tau$.

Consequently, it can be seen from FIGURES 12(A), (B) and (C) that when $n$ is any integer other than zero, samplings at the end of an integration period $\tau$ or during the following storage period, find a desired integration-storage device at a maximum energy for its resonant tone and at a null for undesired other tones.

In detection system 40, an "absolute" ratio circuit 61 receives the simultaneous samplings of gates 56 and 57 and provides an output pulse having an amplitude proportional to the "absolute" ratio of the amplitudes of the samplings. A boundary circuit 67 determines whether or not the "absolute" ratio output of circuit 61 falls within a range of: (1) zero to a boundary value B which indicates a "mark," or (2) boundary B to unity which indicates a "space." Boundary B is considered to be 0.5 in the example for these embodiments. The output of circuit 67 is a pulse for a "mark" decision and no pulse for a "space" decision and is provided to an output point 62.

A bistable circuit of a type well-known in the art may be connected to point 62 to shape the "mark" and "space" decisions into direct-current levels.

Accordingly, the data outputs at terminals 62, 65 and 66 in FIGURE 2 respectively provide information detected from received tones $f_1$, $f_2$ and $f_3$.

Figure 3:
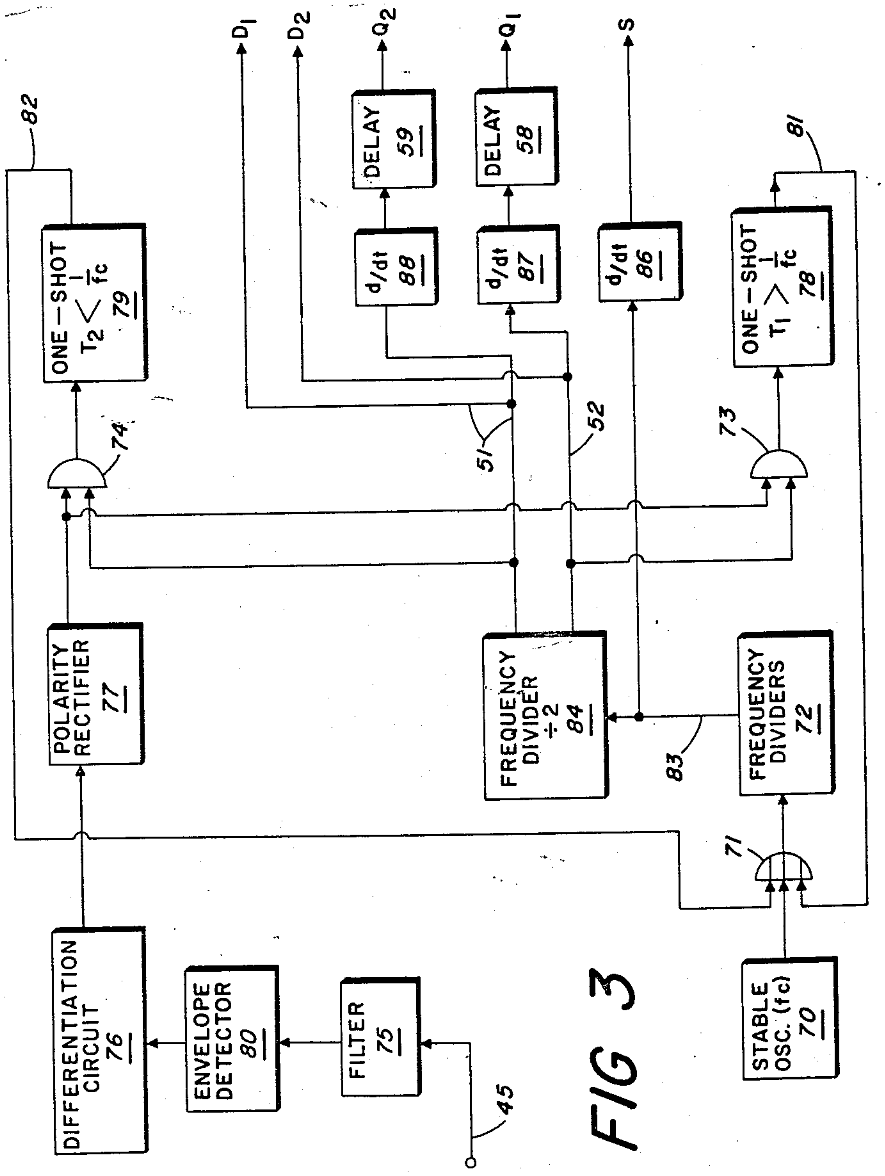
FIGURE 3 illustrates a synchronized time-base which can be utilized in the embodiment of FIGURE 2.

FIGURE 3 illustrates a particular form for bit-synchronization time-base 46 found in FIGURE 2. The time-base includes a stable oscillator 70 which controls signal-bit timing at the receiver in the absence of synchronizing information being received from the transmitter. The output wave-form of oscillator 70 is short duty-cycle pulses.

A frequency divider 72 has an input connected to the output of oscillator 70 through an "or" gate 71. The output of divider 72 is twice the signal-bit rate; and a final binary divider 84 is connected to an output 83 of divider 72 to provide the bit rate. The division ratio of the divider system controls the accuracy of synchronization; the higher the division ratio, the more accurate the synchronization can be. Thus, a division ratio of 256 permits an output synchronization error of less than ±1.5°. If the oscillator 70 and a transmitter clock oscillator have high stability such as about one-cycle-per-second drift per day for a mean frequency of $10^6$ cycles-per-second, synchronization once every 24 hours, for example, for a bit rate of 1000 per second can permit the time-base to operate without necessity for external correction during the interim.

The opposite-phased outputs 51 and 52 from divider 84 provide alternate timing waves $D_1$ and $D_2$ shown in FIGURES 9(A) and (C). Quenching waves $Q_2$ and $Q_1$ are obtained by differentiating and slightly delaying outputs 51 and 52 with differentiators 87 and 88 and with delayers 56 and 57, which provide equal delays of only a few microseconds. Sampling pulses S shown in FIGURE 9(E) are provided from a differentiator 86 connected to output 83 of frequency divider 72.

In order to obtain synchronization between the locally-generated waves and received signal-bits, a filter 75, envelope detector 80, and differentiating circuit 76 are connected in sequence to receiver output 45 to sense the "off-on" and "on-off" switching of the tone which occurs between signal-bits signifying "mark" information. Filter 75 passes all tones of the signal. Detector 80 determines their envelope, and may use the circuit in FIGURE 7(A). Differentiator 76 provides short output pulses of either polarity only when "mark" is received, since there is no switching when a "space" is received. The reason can now be understood for the sequence of "marks" provided from the transmitting system of FIGURE 1 prior to transmission of data. Furthermore, a binary code such as ordinary telegraphic pulse-code has at least one "mark" per character, which assures a continual reception of synchronizing information.

A polarity rectifier 77 connects to the output of differentiator 76 to change all of its output pulses to the same polarity. Rectifier 77 should have as short a time-constant as possible.

A pair of "and" gates 73 and 74 each have an input connected to an output of rectifier 77. Also, each gate 73 and 74 has an input connected to an opposite-phased output of divider 84.

The synchronization system operates to phase the local wave so that its transitions coincide with transitions between bits of a received signal, as represented by pulses from rectifier 77.

When the local wave from bistable 84 has a lagging phase, a differentiated pulse from rectifier 77 finds "and" gate 74 enabled by a high-level half-cycle of wave $D_1$, shown in FIGURE 9(A), and simultaneously finds "and" gate 73 disabled by a low-level half-cycle of wave $D_2$, shown in FIGURE 9(C). On the other hand, when the local wave has a leading phase, a differentiator pulse finds gate 74 disabled by a low-level half-cycle of wave $D_1$, and finds gate 73 enabled by a high-level half-cycle of wave $D_2$. Accordingly, a pulse is provided through gate 74 for a lagging local phase, and through gate 73 for a leading local phase. If lagging, a one-shot 79 is triggered; but if leading, a one-shot 78 is triggered instead. Lagging one-shot 79 provides a very short output pulse having a duration $T_2$ which is much smaller than the period $(1/f_c)$ of oscillator 70. Each lag-indicating one-shot pulse is fed-back through "or" gate 71 to the input of divider 72; and it most likely occurs between output pulses from oscillator 70 to provide an extra pulse at the divider input that advances by a small amount the phase of the frequency-divided local waves from divider 84. The next differentiator pulse causes a further phase-advance, and so on until phase-lock is obtained.

On the other hand, a lead-indicating pulse from one-shot 78 has a duration $T_1$, which is between one and two periods of oscillator 70. Each lead-indicating pulse also is fed-back through "or" gate 71 to the divider input. Since one-shot 78 provides a pulse longer than the period of oscillator 70, it most likely saturates "or" gate 71 during two oscillator pulses and therefore allows the divider input to be triggered only once instead of twice, which normally would occur. Consequently, the frequency-divided local wave is phase-retarded slightly. The next differentiator pulse causes a further phase-retarding, and so on until phase-lock is obtained.

Hence, triggering of either one-shot 79 or 78 occurs until transitions of local waves $D_1$ and $D_2$ very nearly coincide with transitions between signal-bits of a received wave. That is, when the differentiated pulses are centered with the transitions of the local waves $D_1$ and $D_2$, there is insufficient output from either gate 74 or 73 to trigger either one-shot.

FIGURE 4 provides another embodiment of a receiving terminal having three detection systems 240, 263 and 264, which correspond to detection systems 40, 63 and 64 in FIGURE 2 and accomplish the same purpose by providing the same type of detected information at like-numbered output points 62, 65 and 66.

Detection systems 240, 263 and 264 in FIGURE 4 are each identically constructed, except that they have integration devices tuned to different tones; and therefore, only detection system 240 is reduced to component parts. Each detection system in FIGURE 4 has a single integration device 243, as opposed to a pair of like devices required in each detection system in FIGURE 2. Device 243 may be a keyed filter identical to device 43 in FIGURE 2. However, device 243 functions only to integrate. Therefore it does not have the storage function found with device 43. A storage circuit 244 provides the required storage operation in FIGURE 4 for the prior bits. Thus, FIGURE 4 basically differs from FIGURE 2 only in regard to the component separation of the integration and storage functions.

Accordingly, device 243 integrates each signal-bit of received tone $f_1$ in accordance with the higher level of timing D in FIGURE 10(A). Device 243 is sampled and quenched between all integrations of received bits. Quench timing Q is shown in FIGURE 10(B).

An envelope detector 248 of the same type as detector 48 in FIGURES 2 and 7(A) is connected to the output of integration device 243. A pair of sampling gates 256 and 257 have inputs connected to the output of detector 248. A sampling timing $S_1$ is connected to sampling gate 256, and an alternate sampling timing $S_1$ is connected to the input of gate 257. Timing waves $S_1$ and $S_2$ are illustrated in FIGURES 10(F) and (G). An "or" gate 258 couples the outputs of both gates 256 and 257 to one input of ratio circuit 61, wherein the combined samplings have the timing of wave S in FIGURE 10(E).

Thus, integration device 243 is quenched before each integration by timing Q, integrates for a period $\tau$ during the high-level of timing D, is sampled at the end of each integration by timing S, and repeat. FIGURE 10(H) illustrates integration envelopes as detected by detector 248; FIGURE 10(I) shows the combined samplings of detector 248 from "or" gate 258 as alternately obtained from sampling gates 256 and 257.

Ratio and boundry circuits 61 and 67 in FIGURE 4 can be the same as those found in FIGURE 2, and hence the same reference numbers are used.

A prior-bit amplitude-storage circuit 244 in FIGURE 4 stores the amplitude of each integrated signal-bit during a following bit period. Thus, circuit 61 in FIGURE 4 determines the ratio between the sampled amplitudes of a most-recently received bit from gate 258 and a stored prior bit from circuit 244.

Two sections A and B are provided in circuit 244. A slight overlap in storage operations for succeeding bits makes it necessary to have two storage sections A and B, which act alternately within storage circuit 244 to store and read-out succeeding bits without interference. Sections A and B are connected to gates 256 and 257 to receive and store alternate bits sampled by the gates at times $S_1$ and $S_2$ shown in FIGURES 10(E) and (G).

Circuit 244 utilizes capacitor storage, wherein one of capacitors 281 or 286 is charged proportionally to the amplitude of a sampled output from gate 256 or 257, respectively. Since all samplings from gates 256 and 257 have the same duration, their only variable is amplitude; and hence capacitor charge varies only as a function of pulse amplitude. A small capacitor associated with a very high resistance during the storage period can obtain high voltage sensitivity from short pulses.

When its storage period has ended, a capacitor is discharged (quenched) quickly by switching a very low impedance momentarily across it.

Thus, in section A, a capacitor 281 is provided between ground and the output of gate 256. Positive polarity charging is presumed; and a quenching diode 282 has its cathode connected to the active side of capacitor 281 and has its anode connected to the common side of capacitor 281. The cathode receives negative quench timing pulses $Q_1$, shown in FIGURE 10(C), from a source that has a very high output impedance between pulses $Q_1$.

An "and" gate 283 has a very high impedance input connected to capacitor 281, and has another input receiving sampling the timing pulses S, shown in FIGURE 10(G). Thus, gate 283 samples the amplitude of capacitor 281 for alternately stored bits.

The like components in section B operate in precisely the same manner from samplings of gate 257 with reversed sampling and quench timings. Thus, section B has timing $Q_2$ and $S_1$ shown in FIGURES 10(D) and (F). Thus, section B is constructed identically to section A and comprises capacitor 286, quenching diode 287 and high input resistance "and" gate 288.

FIGURES 10(L) and (M) illustrate alternately stored bits in sections A and B as they are provided by samplings from gates 256 and 257 shown in FIGURES 10(J) and (K) obtained from the integrated envelope in FIGURE 10(H).

An "or" gate 289 in circuit 244 combines the alternately sampled outputs of "and" gates 283 and 288 to provide the output of storage circuit 244 to a second input of ratio circuit 61 as representative of the amplitude of each prior signal-bit. FIGURES 10(N) and (O) illustrate the alternate samplings from section gates 283 and 287, which are combined in FIGURE 10(P) to show the output of storage circuit 244. Note that the stored samplings in FIGURE 10(P) are identical to, but are one bit-period behind the envelope samplings from gate 258 illustrated in FIGURE 10(I).

Boundary circuit 67 in FIGURE 4 determines ranges of amplitude ratios for tone $f_1$ in the same manner as was done in FIGURE 2. Thus, if an "absolute" ratio is between 0 and 0.5, a "mark" decision is made; and if a ratio is between 0.5 and 1, a "space" decision is made. Likewise, these decisions are provided on a pulse or no-pulse basis at output point 62; and like circuits can be used.

FIGURE 5 illustrates a detailed form for time-base 246 found in FIGURE 4. In FIGURE 5, the synchronization portion of the time-base is identical to, operates in the same manner, and has the same reference numerals as those found in FIGURE 3, which are 70, 71, 72, 84, 73, 81, 74, 79, 75, 80, 76 and 77. Furthermore, the synchronized waves on leads 51, 52 and 83 in FIGURE 5 are the same as those provided on like-numbered leads in FIGURE 3. Differentiating circuits 87 and 88 provide directly the timing pulses $S_2$ and $S_1$, respectively. Timing pulses Q, $Q_2$ and $Q_1$ are obtained by slightly delaying the outputs of differentiating circuits 86, 87 and 88 by delay devices 291, 293 and 292.

Integration timing D is obtained from a one-shot 296 triggered by the output of differentiator 86 to provide pulses enduring through the sampling and quenching pulses S and Q. Accordingly, the integration period $\tau$ shown in FIGURE 10(A) is provided between one-shot pulses as a direct-current level which gates each integration device, such as 243, in FIGURE 4. Thus, the one-shot pulse duration is equal to the signal-bit period T minus the integration period $\tau$.

FIGURES 6(A) and (B) illustrate variations of a third general type of detection system within the invention. They differ from the embodiments of FIGURES 2 and 4 in that: they use a different sequencing of functions in the detection operation, and they use linear filtering rather than the more perfect non-linear keyed filtering for minimizing cross-interferences between multiplexed tones. The sequencing difference permits storage on an analogue or instantaneous basis rather than on the digital basis of averaged values found in FIGURES 2 and 4. A delay line, storage drum or disc, magnetic tape, or thermoplastic tape can store a received signal on an analogue or instantaneous basis, and a delay line is used in FIGURES 6(A) and (B) as exemplary of these items.

FIGURE 6(A) differs from 6(B) in that the former operates non-coherently, while the latter can operate coherently.

Thus, in FIGURE 6(A) or (B), receiver 42 and antenna 41 may be precisely the same as in FIGURES 2 or 4. In FIGURE 6(A) or (B) only a single modulated tone $f_1$ at receiver output 45 is considered. Thus, a single-tone detection system 340 is connected to receiver output 45. But it also is obvious that the detection system explained therein may be duplicated for plural tones by tuning a respective input filter to a tone to be demodulated.

Detection system 340 includes a filter 341 which selects tone $f_1$. The output of filter 341 is divided into two parts that provide the inputs to an "absolute" ratio circuit 61. One part is substantially undelayed and includes an amplifier 351 followed by an envelope detector 348. The other part includes a delay line 343 followed by an amplifier 352, and an envelope detector 349. The envelope detectors may be constructed as shown in FIGURE 7(A), wherein they are quenched at timing Q. Envelope detectors 348 and 349 have time-constants of the order of one or two periods of frequency $f_1$.

Delay line 343 provides a delay of approximately the signal-bit period T. It is not required to have phase stability: in the sense that the phase of the delay-line output is not maintained at a fixed phase with respect to the delay-line input. Hence, in FIGURE 6(A) the phase does not remain fixed between the two signal parts before they are applied to the inputs of ratio circuit 61. A phaseless relationship is permitted by the smoothing of the signal envelopes by the time-constants of envelope detectors 348 and 349. The greater the smoothing of the envelope, the smaller is the deteriorating effect due to phase instability; but the greater becomes the distortion of the envelope by large noise pulses to reduce the detection signal-to-noise ratio.

It is the lack of any fixed phase-relationship between delayed and undelayed signal parts that makes detector system 340 in FIGURE 6(A) non-coherent.

Circuit 61 in FIGURE 6(A) may be constructed in the same manner as circuit 61 in any of the other figures. However, circuit 61 in FIGURES 6(A) or (B) operates on a continuous basis within each bit period with respect to inputs that may continuously vary in amplitude, rather than with the amplitudes of short-duration pulses as was done in FIGURES 2 and 4. Hence, the ratio output of circuit 61 in FIGURES 6(A) or (B) may be continuously variable.

An integrator 344 receives the continuously variable ratio output from circuit 61 within each bit period. Integrator 344 is quenched at the beginning of each bit-period by timing Q, and it is sampled at the end of each bit-period by timing S after an integration for a period $\tau$ from a quenched condition. It is the purpose of the integration function in FIGURES 6(A) and (B) to evaluate the average ratio over each period $\tau$ in a way similar to the integration functions in FIGURES 2 and 4, which accomplished an averaging operation for signal amplitude. The fact that $\tau$ is the same during all integrations assures that the amplitude of a sampled quantity at the end of each integration is proportional to the average ratio over each period $\tau$ within each signal-bit period. However, the integration in FIGURES 6(A) and (B) is on a direct-current basis, rather than on the alternating-current-envelope basis of the other embodiments which had the additional advantage of filtering, not obtained by the direct-current integration. Thus, FIGURES 12(A), (B) and (C) do not apply to FIGURES 6(A) and (B).

Integrator 344 includes a capacitor 381 connected between the output of circuit 61 and ground. A diode 382 is connected across capacitor 381 and has its anode grounded. Quench timing Q is applied to the cathode of diode 382.

A gate 383 samples the integrated quantities. It has a very-high-impedance input connected to capacitor 381, and another input receives sampling pulses S from time-base 346.

A boundary circuit 67 is connected to the output of gate 383, and can be the same as circuit 67 in FIGURE 7.

Consequently in FIGURE 6(A), the delayed and undelayed waves have their instantaneous envelopes detected, smoothed and applied to circuit 61, which integrates the continuous ratio output during each bit-period. A sampling of the amplitude of each integration after a period $\tau$ determines the average ratio between compared signal-bits. The average-ratio sampling is submitted to boundary circuit 67 for a determination of whether it is above or below a boundary value separating "mark" and "space" ratio ranges, in the manner discussed for the other embodiments, to obtain a "mark" or "space" decision.

The operation of the embodiment in FIGURE 6(A) also can be explained graphically by using the waveforms of FIGURES 11(A)–(I). FIGURE 11(A) illustrates an output of receiver 42 after being passed through filter 341, and it corresponds to the transmitted wave shown in FIGURE 8(E), with noise added.

FIGURE 11(B) illustrates the received wave after it has been delayed by delay line 343 for a signal-bit period T.

FIGURES 11(C) and (D) illustrate the corresponding envelopes of the waves in 11(A) and (B), as provided at the outputs of detectors 348 and 349, respectively.

The instantaneous "absolute" ratio output of circuit 61 is shown in FIGURE 11(E), and integrations thereof are represented by FIGURE 11(F). Samplings of the respective integrations are shown in FIGURE 11(G).

Synchronous time-base 346 in FIGURES 6(A) and (B) may be constructed similarly to the time-base illustrated in FIGURE 5, wherein timing S is obtained from differentiator 36 and timing Q is obtained from delay device 291. FIGURES 11(H) and (I) illustrate the sampling and quenching timing S and Q provided to integrator 344 and gate 383, respectively.

The optimum integration period $\tau$ for FIGURE 6(A) is maximized within its bit period T for best signal-to-noise ratio. However, the maximum integration period $\tau$ is limited by the unstable delay variations of delay line 343. A limiting requirement for integration period $\tau$ is that it should include only one undelayed signal-bit and one delayed signal-bit, which are being ratio compared. An integration is deteriorated if its should include a part of another signal-bit preceding or following either the delayed or undelayed signal bits being compared. Undue variation in the delay time can cause this, as well as synchronization error. Accordingly, period $\tau$ is shortened and centered with respect to bit-periods of the received signal, so that maximum and minimum variations in delay time do not cause a portion of another stored bit to enter an integration period $\tau$. The quench time Q is increased to decrease time $\tau$ to the required amount. The quenching and sampling pulses Q and S accordingly are phased before and after the integration time $\tau$.

The performance of the general system of FIGURE 6(A) can be improved, although it is made more critical, by modifying it into the coherent system of FIGURE 6(B). In FIGURE 6(B), the delayed and undelayed inputs to ratio circuit 61 always undulate with the same phase relationship, and only their amplitudes vary. This is why FIGURE 6(B) provides a coherent system. Thus, circuit 61 in FIGURE 6(B) compares the instantaneous amplitudes of phased undulating waves and does not compare smoothed envelopes as was done in FIGURE 6(A).

Thus, the embodiment of FIGURE 6(B) is largely constructed in the same manner as FIGURE 6(A). In FIGURE 6(B), a phase-adjusting circuit is added to the undelayed part of the signal, although it could have been added instead to the part of the signal that is delayed. Also, polarity rectifiers 361 and 362 are used in FIGURE 6(B) instead of the envelope detectors 348 and 349 in FIGURE 6(A); but they can likewise be constructed with the circuit of FIGURE 7(A) by removing capacitor 164 to obtain a time-constant as short as possible.

Accordingly, a phase-shifter 367 is placed in tandem with amplifier 351. Phase shifter 367 is controlled by phases of the delayed and undelayed signal parts before they are applied to ratio circuit 61. Hence, outputs of amplifiers 351 and 352 are applied as inputs to a phase detector 363, which can be conventional. A 90° phase shifter 364 is provided at one of its inputs so that a null output is provided from the phase detector when the delayed and undelayed waves have either a 0° or 180° phase with respect to each other. A low-pass filter 365 is connected to the phase-detector output, and it has a long time-constant amounting to many bit-periods T. A motor 366 receives the filter output, and its output shaft is coupled to phase shifter 367, which can be of the resolver type. Thus a feedback system is provided which maintains the phase-detector inputs with either 0° or 180° relationship. Polarity rectification by items 361 and 362 removes the 0° or 180° ambiguity and assures that the inputs to ratio circuit 61 vary in step with each other.

The rate of pull-in to a phase-locked condition by the feedback loop controls the rate of change permissable for phase instability of delay line 343, as well as the rate of phase changes which can be tolerated due to transmitter phase (and frequency) instabilities, and phase instabilities due to varying radio propagation conditions.

With phase stability of the type in FIGURE 6(B), filter 341 should be made as broadband as is compatible with selection of a tone to be detected, in order to minimize noise ringing effects in the filter.

Phase shifter 367 is automatically adjusted prior to reception of a signal by connecting a locally-generated frequency $f_1$ from a source 396 to the input of filter 341 by closing switch 397 for a few seconds. During reception of an all "mark" preliminary signal for preliminary adjustment of time-base 346, no usable signal is received for adjustment of phase-shifter 367, because either one or the other of the delayed and undelayed signal parts is absent for a "mark" input signal. However, during reception of signal "spaces," which are represented by a tone continuous for plural periods, phase-shifter 367 receives alignment information. Thus by using a "mark-space" code that has a "space" in every character, phase alignment information is continually received.

Figure 6:
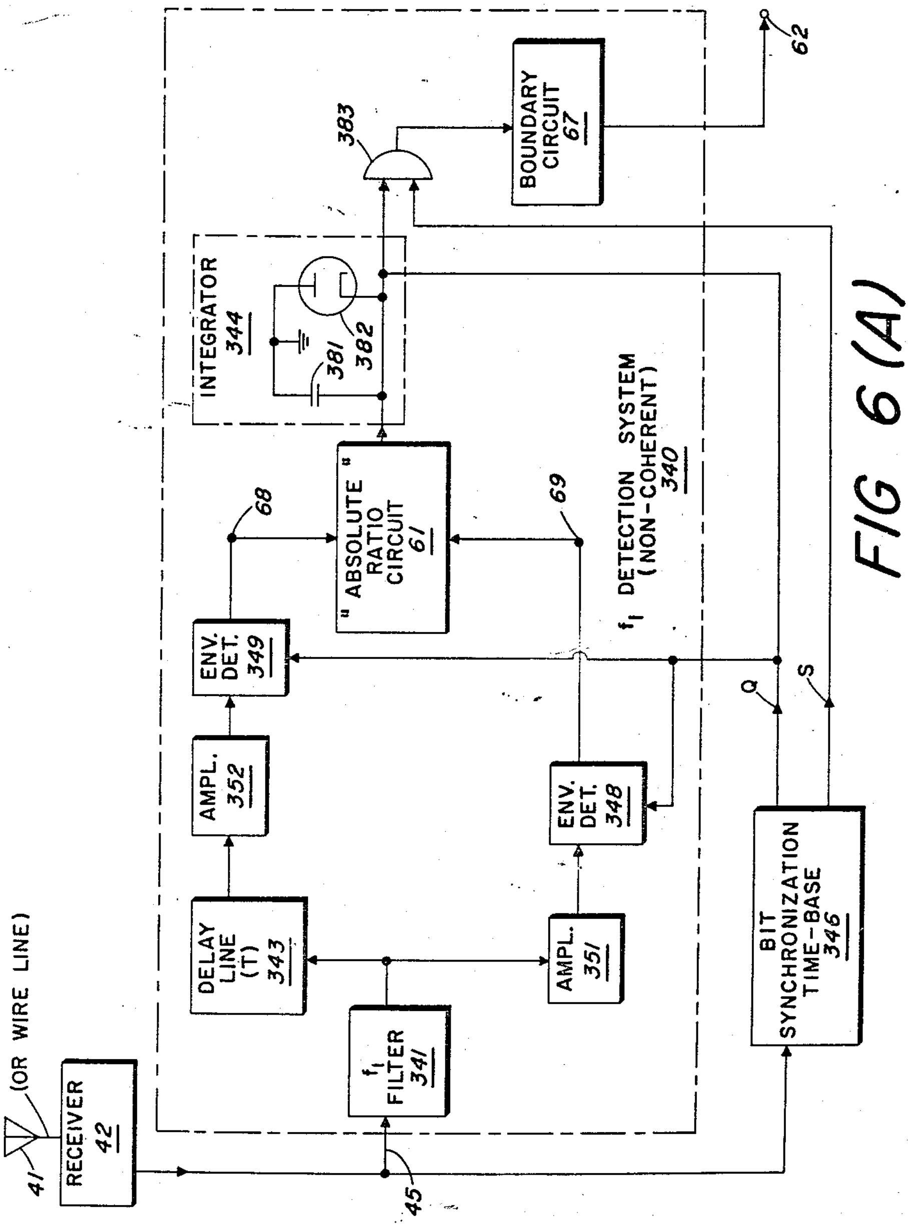
Figure 6:
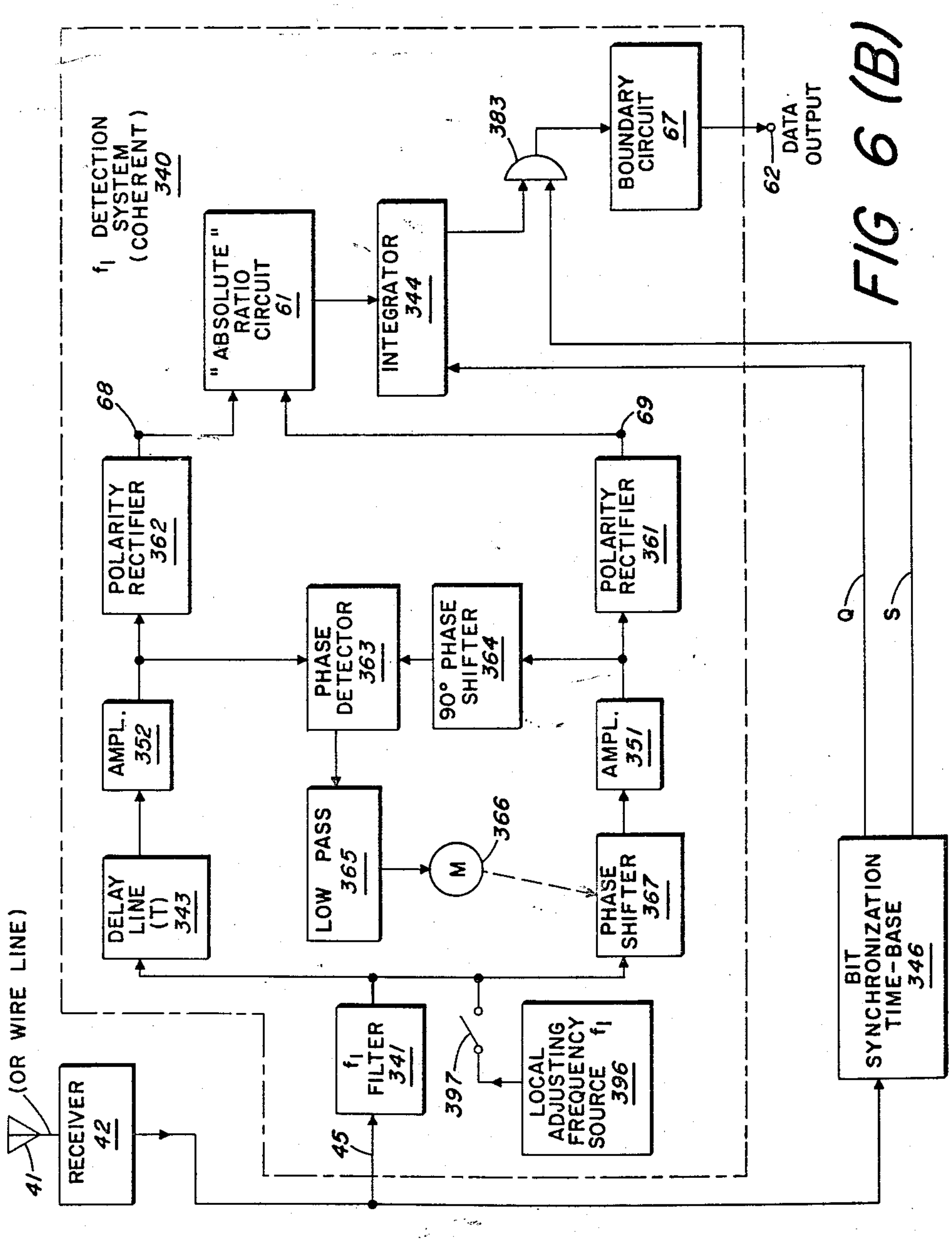

The requirements for an "absolute" ratio circuit 61 in FIGURE 2, 4, or 6 can be obtained by several different types of known circuits. Any circuit may be used which is capable of providing an output that represents the ratio of the amplitudes of two inputs, and that can respond in a sufficiently fast manner.

For example, crossed-field electron-beam circuits can be connected as amplitude dividers, as explained on page 220 of "Electronic Analogue Computers," by Korn & Korn. Also, Hall-effect devices arranged for amplitude division by feed-back arrangement of the type explained on page 124 of "Introduction to Electronic Analogue Computers," by Wass, can be used. Still further, a time-varying technique can be used for determining the ratio between two sampled quantities as taught in an article titled, "Automatic Display of Noise Suppression Factor," by Jun Tamiya found on page 55 of the February 5, 1960, issue of Electronics.

FIGURE 7 shows a logarithmic type of ratio circuit. It includes a pair of logarithmic-amplitude shaping circuits 101 and 102. Their inputs 68 and 69 are the respective inputs of circuit 61. Each shaping circuit may be constructed of diodes and resistors to provide a non-linear amplitude response very closely approximately the logarithmic curve $X=\log A$, where A is the input amplitude and X is the output amplitude of each shaping circuit. Such non-linear shaping circuits may be constructed in the manner taught in "Introduction to Electronic Analogue Computers," by C. A. A. Wass, Section 7.5 titled, "Biased-Diode Devices," starting on page 137.

Thus, the amplitude of output pulses from circuits 101 and 102 is the logarithm of their input amplitude. The choice of logarithmic base depends upon pulse-amplitude range versus the required division sensitivity in a particular design situation.

Since it is presumed that the sampled inputs to circuit 61 have positive polarity, a polarity inverter 103 is provided to reverse the polarity of one of the shaping circuit outputs.

A subtraction circuit 104 receives the simultaneous opposite-polarity pulses derived from the shaping circuits. Subtraction circuit 104 is a summation circuit of the type taught in "Introduction to Electronic Analogue Computers," by Wass, Section 6.1 titled, "Summation by Networks" starting on page 90. A subtraction operation by a summation network is obtained when its inputs have opposite polarity.

The output of subtraction circuit 104 may be either positive or negative, since it is unknown which of its inputs is larger, because it depends on the modulation. Hence, its output may be either log $(A_1/A_2)$ or log $(A_2/A_1)$. Accordingly, a polarity rectifier 105 is provided at its output to change all pulses to the same polarity, thus providing an output quantity proportional to the logarithm of the "absolute" ratio of the sampled pulses.

Boundary circuit 67 in FIGURE 7 may be used as the boundary circuit in FIGURES 2, 4, or 6. In essence, it sets a level, log B, which corresponds to the logarithm of the boundary ratio B. Circuit 67 is arranged so that it provides an output pulse only if the boundary level, log B, is exceeded by the logarithm of the "absolute" ratio of the sampled amplitudes.

Circuit 67 is a biased-diode circuit. The output of rectifier 105 is coupled through a load resistor 112. A diode 116 is connected in series between the rectifier output and output point 62. Since positive-polarity pulses are presumed from rectifier 105, it is connected to the anode of diode 216. A potentiometer 113 is connected between ground and a stable positive direct-current source. The potentiometer is preferably of the logarithmic type. Its tap 114 is connected to the cathode of diode 116. Accordingly, diode 116 is biased by an amount dependent upon the tap setting of potentiometer 113. Thus, the setting of potentiometer 114 determines the boundary between "mark" and "space" decisions.

An amplifier 120 is provided to amplify and limit the pulsed output of boundary circuit 67.

A bistable shaping circuit 121 is connected to the output of amplifier 120 to change the binary information from pulse and no-pulse form to respective direct-current levels, represented by the two output states of bistable 121 provided at a terminal 162.

"And" gates 122 and 126 have outputs connected to triggering inputs 123 and 127 that control respective bistable output levels. Each gate has an input connected either directly, or invertedly through inverter 128 to the output of amplifier 120. Also, each gate has an input connected to sampling-timing S, which is obtainable in either FIGURE 3 or 5 from differentiator 86. Since the sampling timing is coincident with output pulses of circuit 61, bistable 121 is triggered to one level or the other corresponding to a pulse or no-pulse outut from circuit 67 at the instant of a timing pulse.

Although this invention has been described with respect to particular embodiments thereof, it is not to be so limited, as changes and modifications may be made therein which are within the spirit and scope of the invention as defined by the appended claims.

I claim:

1. A system for communicating digits of a data source by ratio amplitude modulation, comprising a wave source, means for bit-synchronously encoding said digits onto said wave source as particular amplitude ratios between adjacent signal-bits, means for transmitting said wave after being encoded, means for receiving said wave, means for computing ratios between amplitudes of adjacent signal-bits of said received wave to provide ratio signals, boundary means defining ratio ranges by particular voltage or current levels with said ranges corresponding to particular digits carried by said received wave, and said boundary means receiving said ratio signals of said ratio computing means and correlating them with said ratio ranges to obtain detection of the digits of the received wave.

2. A detection system for a bit-synchronous wave having data encoded as particular amplitude relationships between adjacent signal-bits of said wave, comprising means for receiving said waves, means for generating a local timing wave that is bit-synchronous with said received wave, means for selecting signal-bits of said received wave with said local timing wave, ratio means for computing ratios between amplitudes of adjacent selected signal-bits to provide corresponding ratio signals, boundary means defining a plurality of ratio ranges by respective voltage or current levels statistically corresponding to particular data conditions of said received wave, and means for applying said ratio signals to said boundary means to determine the ratio ranges corresponding to said ratio signals as a detection of the received wave.

3. A discrete-amplitude system for communicating digits of a synchronous data source, comprising a wave source, an amplitude modulator for said wave source, a trigger circuit having plural stable output amplitude levels, the output of said trigger circuit controlling the output amplitude of said modulator, said trigger circuit connected as a pulse-rate divider, an input of said trigger circuit receiving particular digits of said data source, and said trigger circuit having its output levels changed or not changed by the triggering of particular digits of said data source, whereby the output of said modulator encodes said digits by particular ratios of amplitudes between adjacent signal-bits.

4. A multilevel system for communicating digits of data as a ratio function of amplitude of a transmitted wave, including means for synchronously transmitting multilevel signal-bits of said wave, means for encoding digits of data as predetermined ratios of amplitudes of adjacently transmitted signal-bits, means for receiving said synchronously transmitted signal-bits, means for storing the amplitude level of each received signal-bit, means for computing the ratio between each received signal-bit and the stored signal-bit preceding it, a boundary circuit storing particular voltage or current levels representing a plurality of particular ratio ranges statistically corresponding to different received digits, and means for applying said computed ratios to said boundary circuit to obtain the particular ratio ranges containing said computed ratios, and means for reading out the obtained ratio ranges as detected data.

5. A system for detecting amplitude-keyed modulation having digits encoded as particular amplitude ratios of adjacent received signal-bits, comprising means for storing the amplitude of each received signal-bit, means for computing the ratio between each received bit and the stored signal-bit preceding it, boundary means for storing ratio ranges corresponding to expected ratios for particular ones of said encoded digits, means for comparing each computed ratio with said ratio ranges in said boundary means to detect the digit content of the received signal.

6. A detection system for synchronously received signal-bits of an amplitude-modulated tone having digits encoded as particular amplitude ratios between adjacent signal-bits, comprising a local timing source bit-synchronized with said received signal-bits, at least one integration device resonant at the frequency of said tone, an input of said integration device receiving said signal-bits, said timing source being connected to said integration device to enable its input in synchronism with said signal-bits, said integration device providing envelope integration of its received signal-bits, means for sampling the envelope of each integration at its completion, a storage device for storing the amplitude of each received signal-bit for at least a following signal-bit period, a ratio circuit for providing an output proportional to the ratio of its inputs, the inputs of said ratio circuit connected to said sampling means and said storage device, a boundary circuit defining particular ratio ranges expected for said digits, said boundary circuit receiving the output of said ratio circuit and providing an output correlating each ratio circuit output with its particular ratio range during each signal-bit period to represent a detected digit.

7. A detection system for a ratio-modulated tone that is amplitude-modulated with synchronous signal-bits which encode digits as particular ratios of adjacent signal-bit amplitudes, comprising a pair of integration devices resonant at the frequency of said tone; a local timing source synchronized with said signal-bits and connected to said integration devices to alternately enable, disable and quench said integration devices; said integration devices each receiving one signal-bit during each enablement to integrate it and during each following disablement storing the amplitude of the integration by resonant ringing, a pair of sampling means for simultaneously sampling the respective amplitudes of said pair of integration devices at the end of each integration, said sampling means being connected to said timing source, a ratio circuit having a pair of inputs respectively receiving outputs of said pair of sampling means, an output of said ratio circuit being a voltage or current representing the amplitude ratio of simultaneous outputs of said sampling means, a boundary circuit having a plurality of predetermined ranges respectively correlating with particular digits, said boundary circuit connected to the output of said ratio circuit and providing an output that identifies the ratio range corresponding to each output ratio of said ratio circuit, whereby said ratio range identification is a detection of said modulated tone.

8. A plurality of the detection system defined in claim 7 for respectively detecting a plurality of ratio-modulated tones, in which said tones are frequency spaced by $n/\tau$, where $n$ is an integer other than zero, and $\tau$ is integration time per signal-bit determined by said local timing source, whereby cross-interference among said detection systems is minimized.

9. A detection system for a tone, wherein it is amplitude-modulated with synchronous signal-bits, with digits being encoded as particular amplitude ratios of adjacent signal-bits, comprising an integration device resonant at the frequency of said tone, a local timing source synchronized with said signal-bits and connected to said integration device to quench and to enable it to integrate received signal-bits in sequence, first sampling gate means connected to said timing source and sampling the amplitude in said intergration device at the end of each signal-bit, an amplitude-storage circuit connected to said first sampling-gate means to store each sampled amplitude for at least a following signal-bit period, a second sampling-gate means connected to said storage circuit to sample its amplitude at the end of each signal-bit period, a ratio circuit having inputs connected to said first and second sampling-gate means, an output of said ratio circuit representing the ratio of its inputs from said sampling-gate means, boundary-circuit means defining particular voltage or current ranges corresponding to expected ranges of ratios from said ratio circuit output representing particular digits carried by said tone, and said boundary-circuit means connected to said ratio circuit output to provide as its detected output respectively identified ranges that include the outputs of said ratio circuit.

10. A plurality of the detection systems defined in claim 9 for respectively detecting a plurality of ratio-modulated tones, in which said tones are frequency spaced by $n/\tau$, where $n$ is any integer other than zero, and $\tau$ is integration time per signal-bit obtained from said local timing source, whereby cross-interference between said detection system is minimized.

11. A system for detecting a plurality of received ratio-modulated signals, wherein the modulation is provided by a comparison between the amplitude levels of adjacent keyed bits of each of said signals, which are bit-synchronously provided, center frequencies of said signals being adjacently spaced by $\Delta f$, comprising a plurality of integration devices receiving said signals, said integration devices tuned to the different frequencies of said plurality of signals, said integration devices being very high Q resonators, means for simultaneously quenching all of said integration devices prior to a respective integration of simultaneous bits of said signals, means for simultaneously sampling said integration devices at a time $\tau$ after the beginning of simultaneous integrations of said plural signals, with $\tau$ being equal to $$\frac{n}{\Delta f}$$

where $n$ is any integer other than zero, a plurality of means for storing the amplitude levels of simultaneous samplings, a plurality of ratio circuits for computing the ratios between the amplitudes of each sampled bit and the amplitudes of the preceding stored bits for the respective tones, a plurality of boundary circuits respectively providing boundary voltage levels and receiving the computed ratios, said boundary circuits respectively comparing the computed ratios with respective boundary voltage levels to determine whether said computed ratios are above or below the respective boundary levels to detect "mark" and "space" digits.

12. A detection system for an input ratio-modulated tone, wherein it is amplitude-modulated with synchronous signal-bits, with digits being encoded as particular amplitude ratios of adjacent signal-bits, comprising analogue time-delay means receiving said input tone, said time-delay means providing a time delay of one signal-bit period for its output delayed tone, a ratio circuit, a pair of inputs of said ratio circuit respectively receiving the input tone and the delayed tone, an output of said ratio circuit providing the analogue amplitude ratio of its inputs, an integrator connected to the output of said ratio circuit to integrate it, a local timing source synchronized with received signal-bits, said timing source connected to said integrator to quench it prior to each integration within a signal-bit period, sampling means connected to said integrator and said timing source to sample the integrator at the end of each integration, a boundary circuit connected to said sampling means to evaluate each sampling of said integrator, said boundary circuit defining specific ratio ranges expected to correspond to particular digits, the output of said boundary circuit being identifications of particular ratio ranges that includes the respective samplings of said integrator.

13. A circuit as defined in claim 12, further including a pair of envelope detectors tandemly connected to the respective inputs of said ratio circuit.

14. A detection system, as defined in claim 12, further including an adjustable phase shifter connected in series with either said delayed or input tone.

15. A detection system as defined in claim 13, further including a phase detector having inputs respectively receiving said delayed and input tones, a 90° phase shifter connected in tandem with either of said phase-detector inputs, and a feedback loop connecting the output of the phase detector to said adjustable phase shifter to maintain a fixed phase relationship between the phase-detector inputs, which are the delayed and undelayed tone inputs to said ratio circuit.

16. A circuit as defined in claim 15, further including a pair of polarity rectifiers tandemly connected to the respective inputs of said ratio circuit and connected after the inputs to said phase detectors.

References Cited in the file of this patent

UNITED STATES PATENTS 2,924,812 Merritt ---------------- Feb. 9, 1960
2,947,971 Glauberman ------------ Aug. 2, 1960